(12) United States Patent
Harada et al.

(10) Patent No.: US 6,543,803 B1
(45) Date of Patent: Apr. 8, 2003

(54) AIR BAG APPARATUS

(75) Inventors: Masami Harada, Tochigi-Ken (JP); Yosuke Higashi, Tochigi-ken (JP)

(73) Assignee: TS Tech Co., Ltd. (JP)

( * ) Notice: Subject to any disclaimer, the term of this patent is extended or adjusted under 35 U.S.C. 154(b) by 0 days.

(21) Appl. No.: 09/616,435

(22) Filed: Jul. 14, 2000

(30) Foreign Application Priority Data

Jul. 16, 1999 (JP) .......................................... 11-203023
Dec. 3, 1999 (JP) .......................................... 11-345416

(51) Int. Cl.[7] ............................................. B60R 21/16
(52) U.S. Cl. ............................. 280/730.2; 280/728.2; 280/743.1
(58) Field of Search ............................. 280/730.2, 743.1, 280/728.2, 730.1

(56) References Cited

U.S. PATENT DOCUMENTS

| 4,944,527 | A | * | 7/1990 | Bishop et al. | ............... | 280/743 |
| 5,062,664 | A | * | 11/1991 | Bishop et al. | ............... | 280/743 |
| 5,094,476 | A | * | 3/1992 | Chihaya | ............... | 280/743 |
| 5,332,259 | A | * | 7/1994 | Conlee et al. | ............... | 280/738 |
| 5,533,750 | A | * | 7/1996 | Karlow et al. | ............. | 280/728.2 |
| 5,564,739 | A | * | 10/1996 | Davidson | ................ | 280/730.2 |
| 5,632,506 | A | * | 5/1997 | Shellabarger | ............ | 280/743.1 |
| 5,833,266 | A | * | 11/1998 | Bartoldus et al. | ........ | 280/728.2 |
| 5,906,395 | A | * | 5/1999 | Isaji et al. | ............... | 280/728.2 |
| 5,944,342 | A | * | 8/1999 | White, Jr. et al. | ....... | 280/743.1 |
| 5,975,567 | A | * | 11/1999 | Higashiura | ............... | 280/730.2 |
| 5,997,036 | A | * | 12/1999 | Hamada | .................. | 280/743.1 |
| 6,142,507 | A | * | 11/2000 | Okuda et al. | ............. | 280/730.2 |

FOREIGN PATENT DOCUMENTS

| JP | 10016690 A | * | 1/1998 | .......... B60R/21/20 |
| JP | 10053081 A | * | 2/1998 | .......... B60R/21/16 |
| JP | 10086772 A | * | 4/1998 | .......... B60R/21/16 |
| JP | 10203292 A | * | 8/1998 | .......... B60R/21/22 |
| JP | 10250516 A | * | 9/1998 | .......... B60R/21/16 |
| JP | 11115673 | | 4/1999 | |
| JP | 11291852 A | * | 10/1999 | .......... B60R/21/16 |

* cited by examiner

Primary Examiner—Paul N. Dickson
Assistant Examiner—Joselynn Y. Sliteris
(74) Attorney, Agent, or Firm—Dann, Dorfman, Herrell and Skillman, P.C.

(57) ABSTRACT

The invention provides an air bag apparatus which can securely prevent gas, generated from an inflator, from leaking from an insertion port of an air bag provided in a mounting base portion of the air bag. The air bag apparatus has a gas generating inflator (2) for expanding and developing an air bag (1) assembled in an inner portion from an insertion port (1c) provided in a mounting base portion (1b) of the air bag (1). The inflator (2) is positioned inside the air bag (1). An internal contact fabric (4) for closing the insertion port (1c) of the air bag (1) from the inner side is provided for preventing a gas leakage, and an external contact fabric (5) is provided for reinforcing the bag mounting base portion (1b).

7 Claims, 14 Drawing Sheets

DEVELOPING DIRECTION

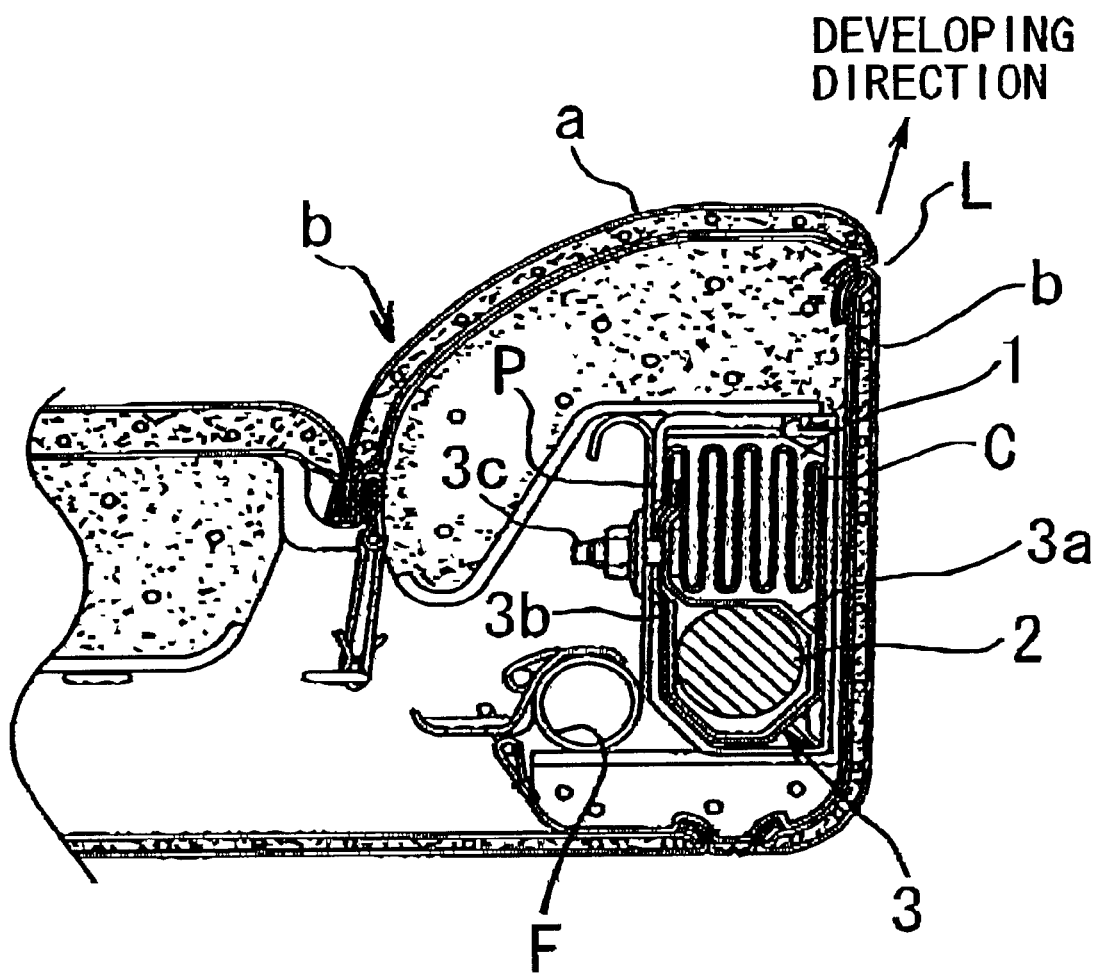

AIR BAG APPARATUS

BACKGROUND OF THE INVENTION

1. Field of the Invention

The present invention relates to an air bag apparatus in which a gas generating inflator for expanding and developing an air bag is assembled in an inner portion of the air bag apparatus from an insertion port provided in a mounting base portion of the air bag, and mainly to an improvement of an air bag structure which prevents the gas generated from the inflator from leaking from the insertion port in the mounting base portion.

2. Description of the Prior Art

As an air bag apparatus for protecting a passenger, there has been known a structure made such that a gas generating inflator for expanding and developing an air bag is assembled in an inner portion of the air bag apparatus from an insertion port provided in a mounting base portion of the air bag and a closing fabric for covering the insertion port of the air bag is provided on-an outer side of the air bag, thereby preventing the gas, generated from the inflator for expanding and developing the air bag, from leaking from the insertion port of the mounting base portion (Japanese Patent Application Laid-Open No. 11-115673).

In the air bag apparatus, since the structure is made such that the insertion port of the air bag is covered with the closing fabric from the outer side of the air bag, the gas generated from the inflator operates toward the closing fabric from the insertion port of the mounting base portion and the closing fabric expands in a direction of moving apart from an outer side surface of the air bag, whereby it is impossible to completely prevent the gas leakage.

In the air bag apparatus, in addition to the closing fabric, the structure is made such that a reinforcing fabric having a slit corresponding to the insertion port of the mounting base portion is provided in an inner side of the air bag, however, it is impossible to prevent the gas, generated from the inflator, from operating toward the closing fabric from the insertion port of the mounting base portion.

SUMMARY OF THE INVENTION

A main object of the present invention is to provide an air bag apparatus which can securely prevent gas, generated from an inflator, from leaking from an insertion port provided in a mounting base portion of an air bag.

Further, another object of the present invention is to provide an air bag apparatus in which an inflator can be easily assembled in an inner portion of an air bag so as to securely prevent gas leakage.

In addition, the other object of the present invention is to provide an air bag apparatus in which an air bag can be folded in such a manner as to be expandable so as to be mounted in a compact manner with a reduced number of parts.

Further, the other object of the present invention is to provide an air bag apparatus in which an air bag can be securely put together in such a manner as to be expandable and developable.

BRIEF DESCRIPTION OF THE DRAWINGS

FIG. 14 is a schematic view showing the air bag apparatus in accordance with the present invention in a state of being assembled in an inner portion of a seat back.

DESCRIPTION OF THE PREFERRED EMBODIMENTS

Figure 1:
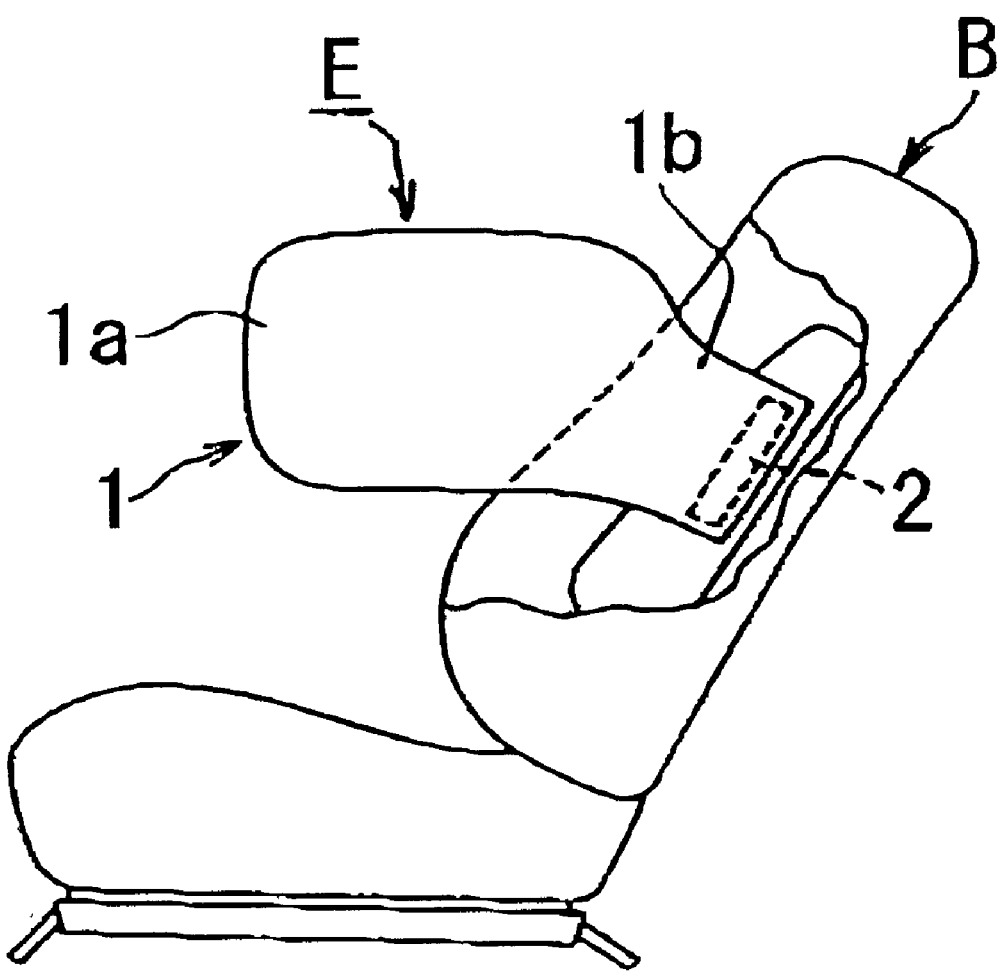
FIG. 1 is a partly notched side elevational view showing a seat for an automobile provided with an air bag apparatus in accordance with the present invention in a state that an air bag is expanded and developed.
Figure 2:
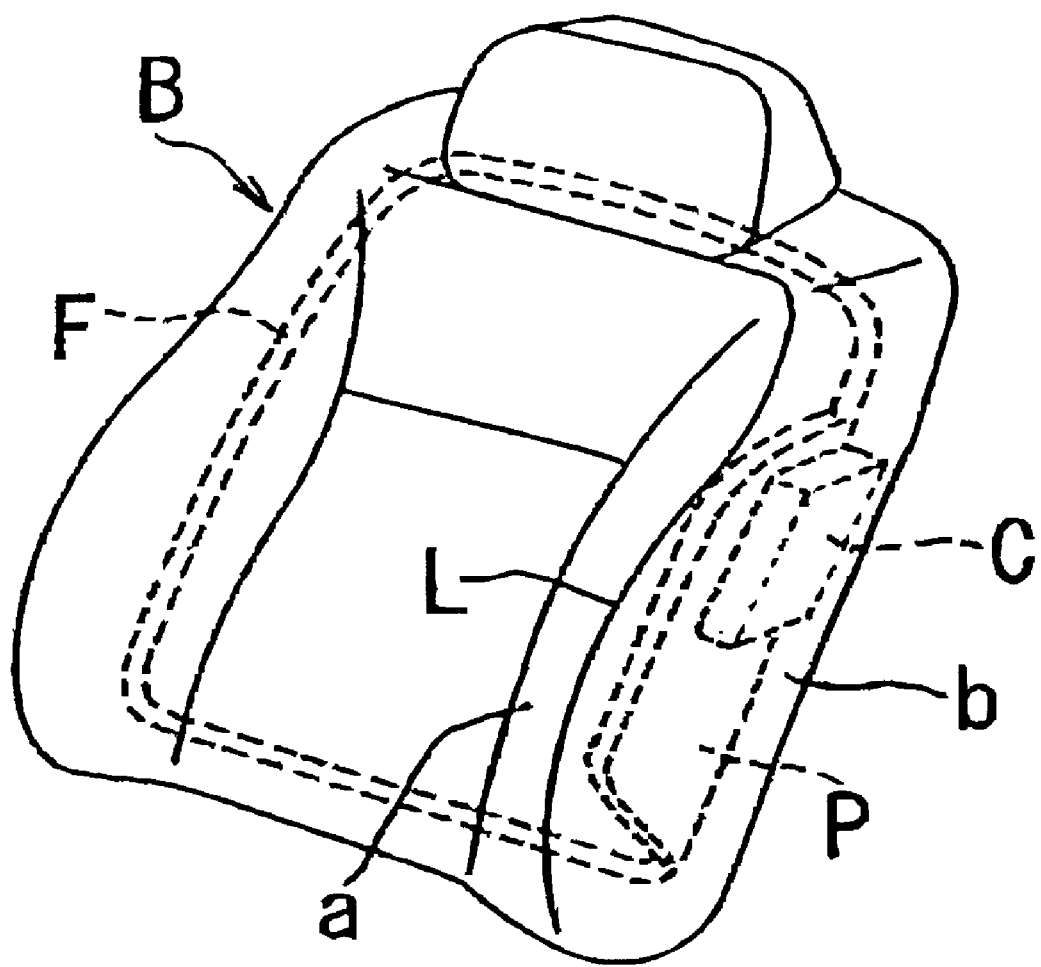
FIG. 2 is a perspective view showing a seat back of the automobile seat provided with the air bag apparatus in accordance with the present invention.

A description will be given below of an embodiment in accordance with the present invention with reference to the accompanying drawings. The embodiment is illustrated as a structure constituting an air bag apparatus E provided in a left side of a seat back B in an assistant seat as shown in FIGS. 1 and 2.

The air bag apparatus E is provided with an air bag case C capable of being opened due to an expansion pressure of an air bag 1, receives the air bag 1 in an inner portion of the air bag case C in a state of folding the air bag 1 In an expandable and developable manner, and is mounted In an inner portion of the seat back B by screwing and fastening the air back case C to a side plate P of a seat back frame F by bolts.

Further, the air bag apparatus is mounted in a state that a sewing portion L between a front surface cover portion a and a side surface cover portion b in a seat cover for covering a bank portion of the seat back B is formed as a breaking portion of the seat cover which is broken according to an expansion and development of the air bag 1.

Figure 3:
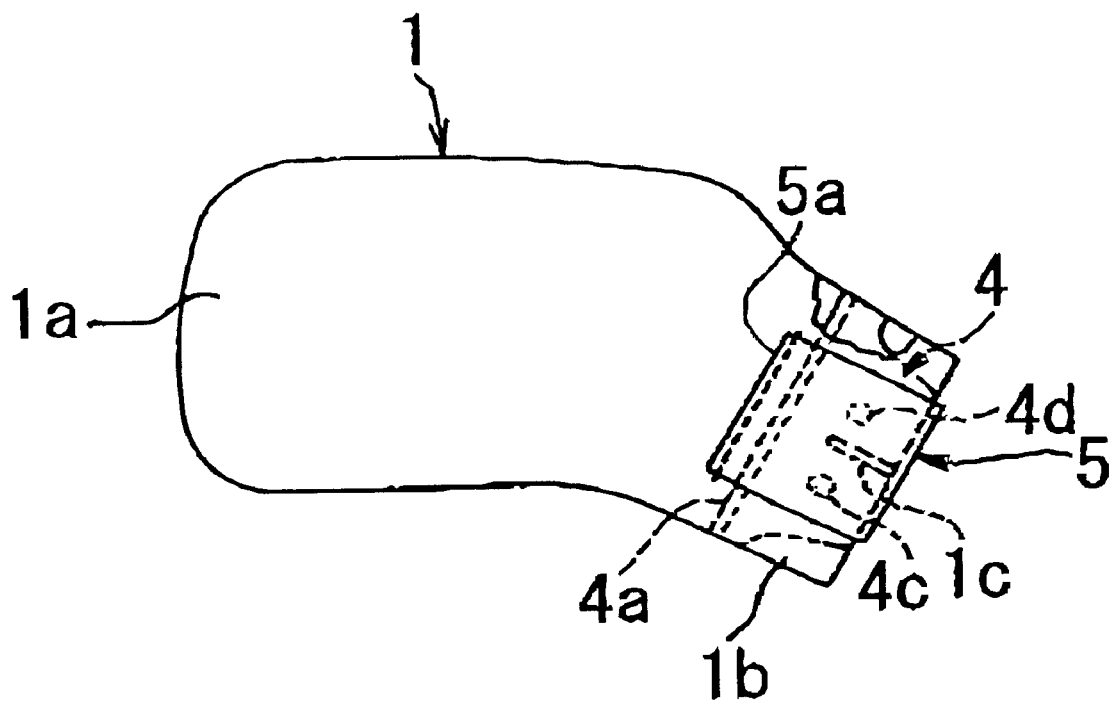
FIG. 3 is a partly notched side elevational view showing the air bag of the air bag apparatus in accordance with the present invention in an expanded and developed state.

The air bag 1 is formed by sewing a bag main body 1a folded in such a manner as to be capable of expanding and developing and a bag mounting base portion 1b relatively narrower than the bag main body 1a as shown in FIG. 3 so as to totally show a bag shape. In the air bag 1, an insertion port 1c used for assembling an inflator mentioned below in an inner portion of the air bag is provided in the bag mounting base portion 1b. The insertion port 1c of the air bag is formed by a slit extending to both surfaces of the mounting base portion 1b from a substantially center portion of the bag mounting base portion 1b, or the like.

Figure 4:
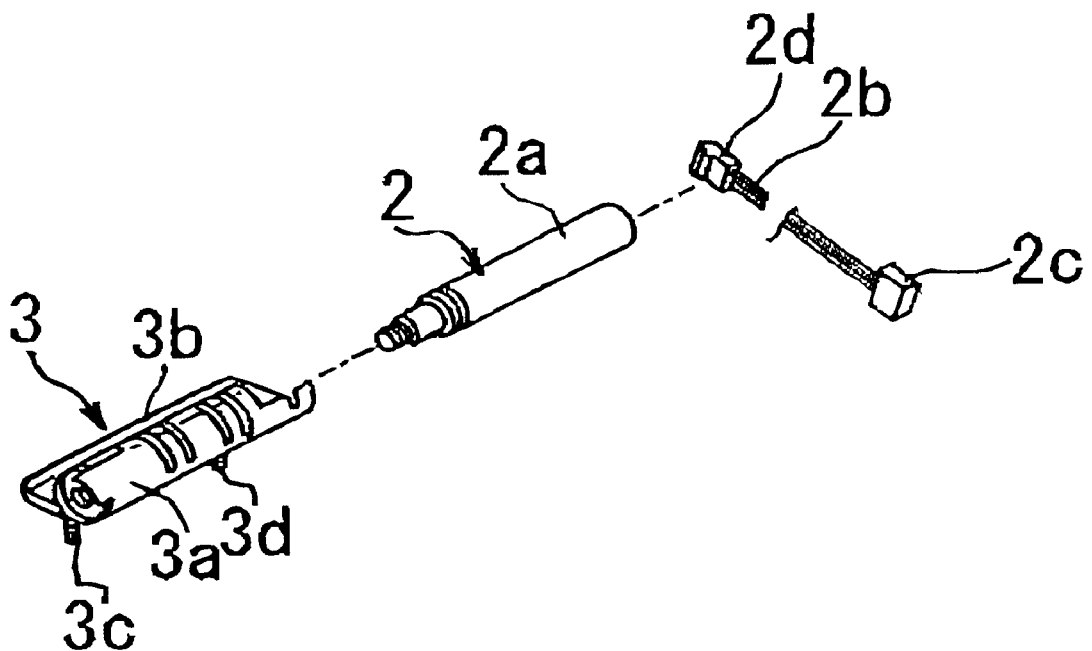
FIG. 4 is an exploded perspective view showing an inflator and a retainer of the air bag apparatus in accordance with the present invention.

An inflator 2 shown in FIG. 4 is assembled in an inner portion of the bag mounting base portion 1b. The inflator 2 is structured such as to generate gas, required for expanding and developing the air bag 1, from an inflator main body 2a, and is provided with a harness 2b and connector 2c, 2d required for forming a circuit with respect to a relational device such as an impact sensor or the like. The harness 2b is connected to the inflator main body 2a through the connector 2d and is drawn out of the air bag 1 via an insertion hole (not shown) provided in a side portion of the air bag 1.

The inflator 2 is held by a retainer 3 and assembled in the inner portion of the air bag 1. The retainer 3 is constituted by a substantially cylindrical holder portion 3a for fitting and holding the inflator main body 2a, a base plate portion 3b corresponding to a placing plate, and fastening bolts 3c and 3d stood from and provided on the base plate portion 3b (hereinafter, referred to as "fastening bolts for the retainer"). The fastening bolts 3c and 3d for the retainer 3 serve as mounting shafts for the inflator 2, and through-holes through which the fastening bolts 3c, 3d are inserted are formed in a bottom surface of the air bag case and a side surface of the mounting base portion 1b.

Figure 5A:
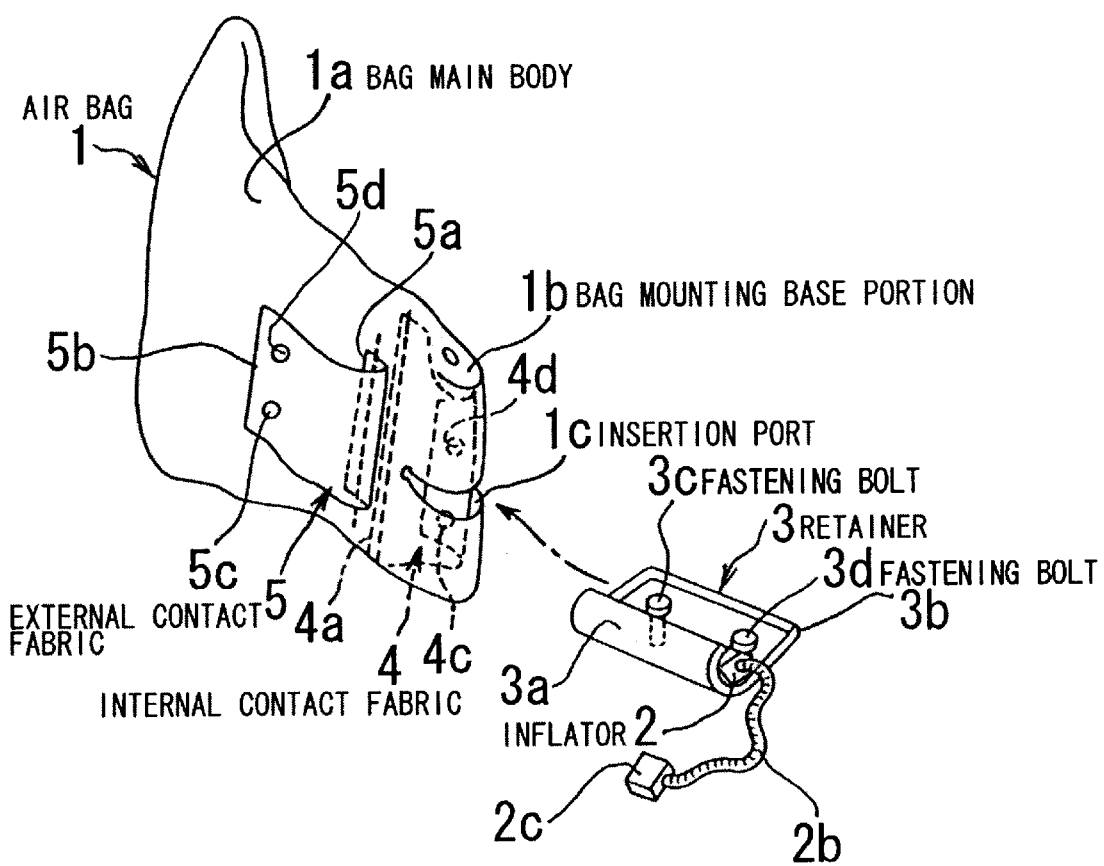
FIG. 5a is a schematic view showing the air bag apparatus in accordance with the present invention in correspondence to an assembling step of the inflator.

As shown in FIGS. 3 and 5a, an internal contact fabric 4 for closing the insertion port 1c is applied onto an inner surface of the air bag 1. The internal contact fabric 4 receives the inflator 2 and closes the insertion port 1c, to thereby prevent the gas, generated from the inflator 2, from leaking from the insertion port 1c of the air bag 1 provided in the bag mounting base portion 1b (additionally refer to FIG. 3). The internal contact fabric 4 can be formed by a fabric material which is the same as that of the air bag 1 and does not bring about gas leakage.

The internal contact fabric 4 is formed in a web shape which is at least longer than the insertion port 1c extending to the both surfaces of the mounting base portion 1b toward a direction of the bag main body 1a from the substantially center portion of the bag mounting base portion 1b. In the illustrated embodiment, one end portion 4a of the fabric 4 is formed to be wide and sewed along a width direction, thereby being sewed on the inner surface of the air bag 1. Further, the other end portion 4b of the fabric 4 is formed as a free end for receiving the inflator 2 inside together with the retainer 3.

Since the internal contact fabric 4 receives the inflator 2 inside together with the retainer 3, the internal contact fabric 4 is provided in such a manner as to engage the free end 4b with the bolts 3c and 3d of the retainer 3 in the inner portion of the air bag 1 so as to cover the insertion port 1c of the air bag 1 and be applied to the inner surface of the bag mounting base portion 1b. Through holes 4c and 4d engaged with the fastening bolts 3c and 3d of the retainer 3 are formed in portions of the fabric 4 which are close to the free end 4b.

In addition to the internal contact fabric 4, there is provided an external contact fabric 5 for surrounding the mounting base portion 1b of the air bag 1 between both side surfaces from the outer side. The external contact fabric 5 is formed by the same fabric material as that of the air bag 1 or the other strong material, and is pressed by the retainer 3 together with the internal contact fabric 4 so as to stand against an expansion pressure of the air bag main body 1a and assembled and fixed to the inner portion of the air bag case, thereby being provided for reinforcing the bag mounting base portion 1b.

The external contact fabric 5 is also structured such that one end portion 5a is sewed on the outer surface of the air bag 1, and the other end portion 5b surrounds the mounting base portion 1b of the air bag 1 between both side surfaces from the outer side and engaged with and fixed to the fastening bolts 3c and 3d of the retainer 3 protruding to the outer portion from the inner portion of the air bag 1. Through holes 5c and 5d for being engaged with the fastening bolts 3c and 3d of the retainer 3 are also formed in the other end portion 5b.

In order to construct the air bag apparatus E from the respective portions, as shown in FIG. 5a, the inflator 2 is held by the holder portion 3a of the retainer 3 and is inserted into the inner portion of the air bag 1 from the insertion port 1c of the air bag 1 except the harness 2b and the connector 2c. At this time, the inflator 2 may be inserted to a back side of the air bag 1 by moving below a lower side of the internal contact fabric 4 from the free end 4b thereof together with the retainer 3, the surface close to the end portion of the free end 4b may be moved to the bottom surface side of the base plate portion 3b, and the fastening bolts 3c and 3d of the retainer 3 may be inserted through holes (not shown) of the air bag 1 from the through holes 4c and 4d of the internal contact fabric 4 so as to be protruded outward.

Figure 5B:
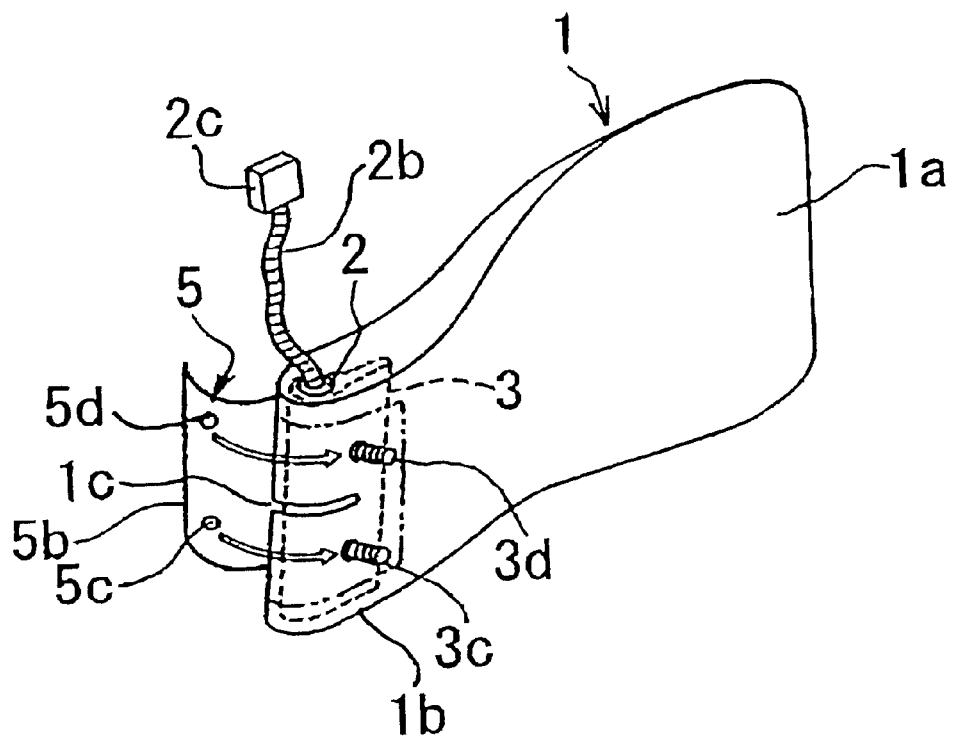
FIG. 5b is a schematic view showing the air bag apparatus in accordance with the present invention in correspondence to an assembling step of an external contact fabric.

In a state that the inflator 2 is assembled in the inner portion of the air bag 1 together with the retainer 3, the harness 2b may be later connected to the inflator main body 2a from the outer side of the air bag 1 as shown in FIG. 5b. Further, the external contact fabric 5 may surround the bag mounting base portion 1b between both side surfaces from the outer side by means of the one end portion 5a sewed to the outer side surface of the air bag 1 and the other end portion 5b may be engaged with and fixed to the fastening bolts 3c and 3d of the retainer 3, protruding outwardly from the inner portion of the air bag 1, by the through holes 5c and 5d.

Figure 5C:
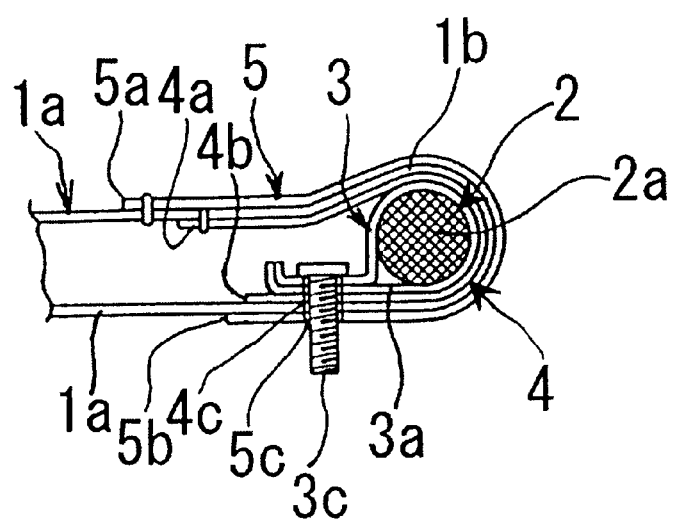
FIG. 5c is a partly cross sectional view showing the air bag apparatus in accordance with the present invention in correspondence to an assembling state of respective parts.

In the air bag apparatus structured in this manner, as shown in FIG. 5c, the inflator 2 is held by the retainer 3 and is easily assembled so as to be received inside from the free end 4b of the internal contact fabric 4 by the inner portion of the air bag 1. Further, the insertion port 1c of the air bag 1 is closed by the internal contact fabric 4 provided along the inner surface of the bag mounting base portion 1b from the inner side.

The internal contact fabric 4 is provided inside the air bag 1 and an expansion pressure is applied to the internal contact fabric 4, whereby the internal contact fabric 4 is pressure contact to the inner side surface of the bag mounting base portion 1b. Accordingly, it is possible to completely seal the insertion port 1c of the air bag 1 and it is possible to prevent the gas, generated from the inflator 2, from leaking.

Since the internal contact fabric 4 is structured such that one end portion 4a is sewed on the inner surface of the air bag 1 and the other end portion 4b receiving the inflator 2 inside and corresponding to the free end is engaged with the fastening bolts 3c and 3d of the retainer 3 within the air bag 1, it is possible to prevent a position shift caused by an assembly of the inflator 2 and an application of the expansion pressure of the air bag 1 and it is possible to securely close the insertion port 1c of the air bag 1 from the inner side.

In addition, since the internal contact fabric 4 mentioned above receives the retainer 3 for holding the inflator 2 in the inner side thereof and is brought into contact with and fixed to the inner portion of the air bag case together with the bag mounting base portion 1b by the base plate portion 3b of the retainer 3, the internal contact fabric 4 can be pressed from the inner side between the holder portion 3a and the base plate portion 3b in the retainer 3 and can be tensioned to the inner surface of the bag mounting base portion 1b so as to securely cover the insertion port 1c of the air bag 1.

Since the external contact fabric 5 is structured such that one end portion 5a is sewed to the outer side surface of the air bag 1 and the other end portion 5b is hooked and fixed to the fastening bolts 3c and 3d of the retainer 3, protruding from the inner portion of the air bag 1 to the outer portion thereof, in such a manner as to surround between both side surfaces of the bag mounting base portion 1b from the outer side, it is possible to prevent a position shift caused by an assembly and it is possible to securely reinforce the bag mounting base portion 1b.

Figure 6:
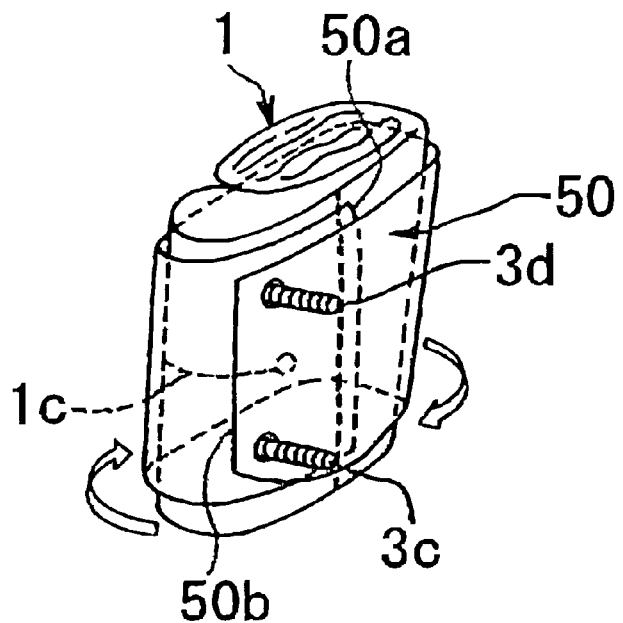
FIG. 6 is a perspective view showing an air bag apparatus in accordance with the second embodiment of the present invention in correspondence to an assembling state of respective parts.
Figure 7:
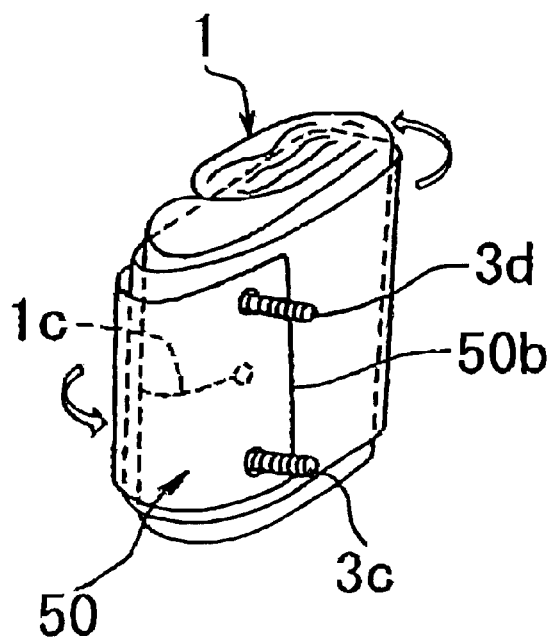
FIG. 7 is a perspective view showing an air bag apparatus in accordance with the second embodiment of the present invention in correspondence to an assembling state of respective parts.

Referring to FIGS. 6 and 7, there is illustrated a second embodiment of the present invention, in which an external contact fabric 50 may be structured such as to surround a whole of the air bag 1 from the outer side in a state of folding the air bag 1 in such a manner as to be capable of expanding and developing, and to hook and fix the other end portion 50b to the fastening bolts 3c and 3d of the retainer 3 protruding outward from the inner portion of the air bag 1 by through holes 50c and 50d. Accordingly, the external contact fabric 50 is provided for reinforcing the bag mounting base portion 1b and preventing a whole disengagement.

Figure 8:
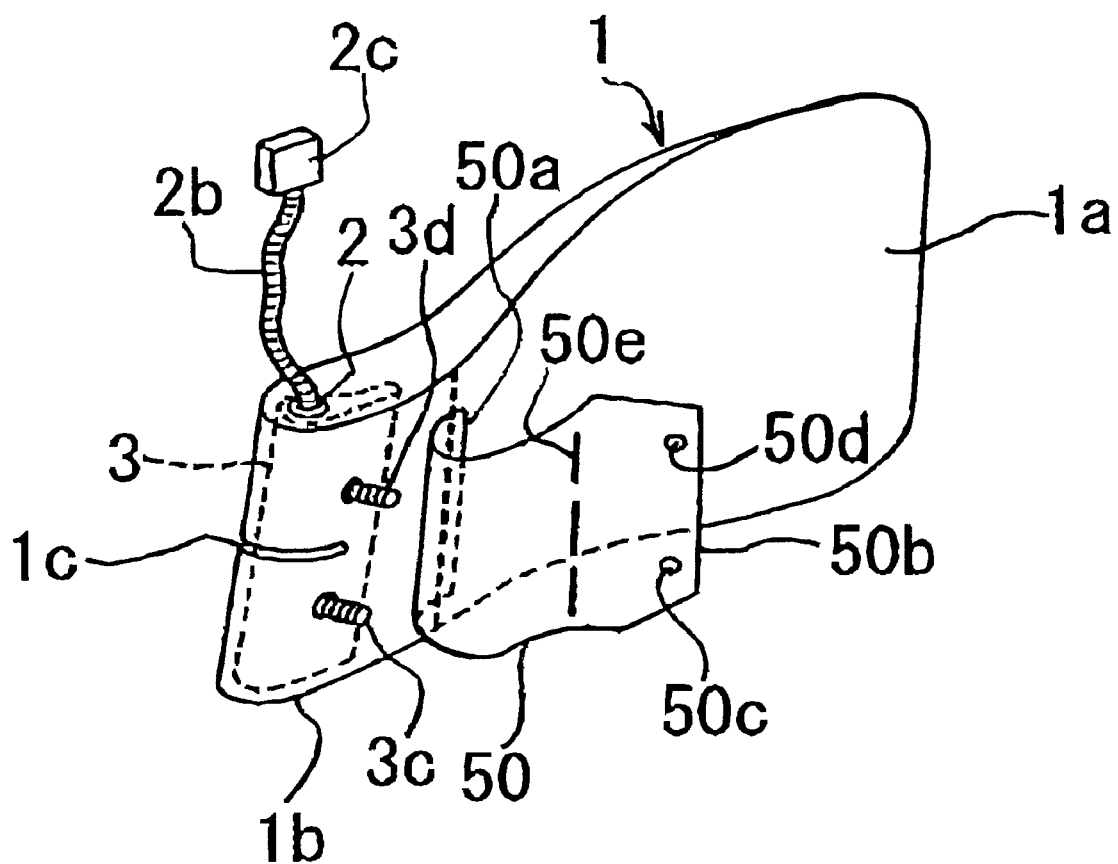
FIG. 8 is a schematic view mainly showing an external contact fabric provided in the air bag apparatuses shown In FIGS. 6 and 7.

In the external contact fabric 50, as shown in FIG. 8, a breaking portion 50e broken according to an expansion and development of the air bag 1 is provided by a plurality of vertically intermitting slits or the like. If the external contact fabric 50 having the breaking portion 50e is provided, it is possible to easily break the external contact fabric 50 due to the expansion pressure of the air bag 1 so as to quickly develop the air bag 1 even when the air bag 1 is folded and wholly surrounded.

Figure 9:
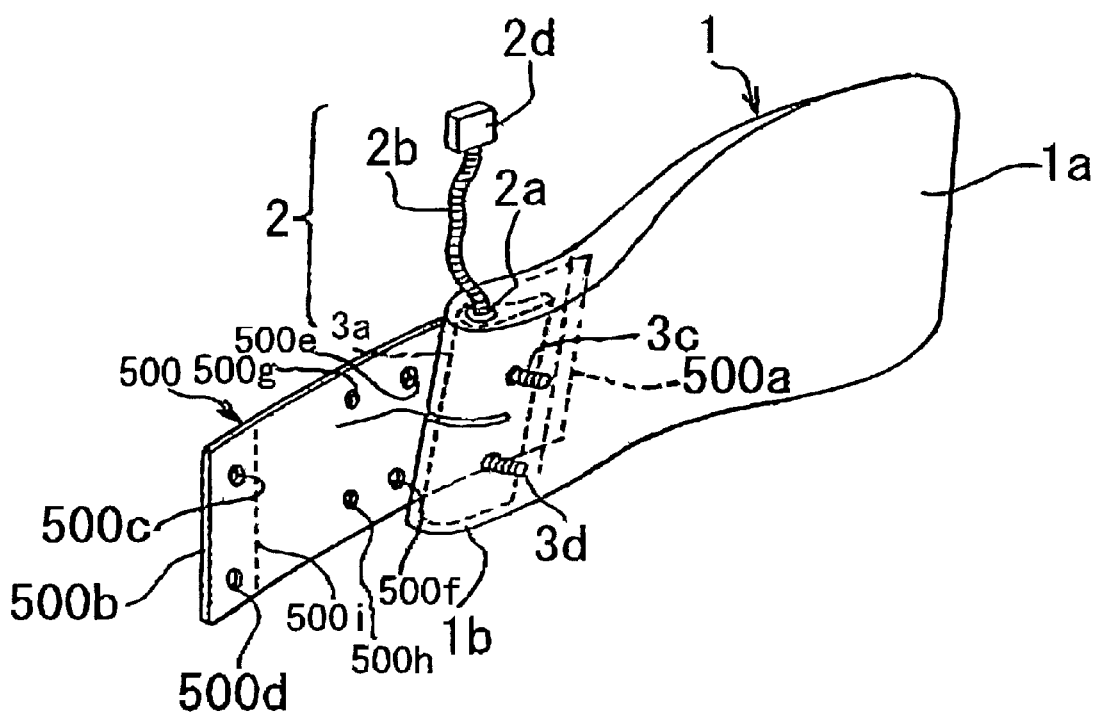
FIG. 9 is a schematic view showing an air bag apparatus in accordance with the third embodiment of the present invention in a state that an air bag is developed.

In place of the external contact fabrics 5 and 50 mentioned above, as shown in FIG. 9, there can be provided an external contact fabric 500 obtained by sewing one end portion 500a to a side surface of the air bag 1 which is opposite to the side of the air bag 1 where the fastening bolts 3c and 3d of the retainer 3 protrude. In the external contact fabric 500, in addition to through holes 500c and 500d with which the fastening bolts 3c and 3d are engaged and which are formed in the other end portion 500b, two pairs of through holes 500e, 500f, 500g and 500h are provided in a middle portion of the fabric 500 with being apart from each other. Further, a breaking portion 500i is provided in a width direction of the fabric 500 so as to be positioned in a front side in a direction of expanding and developing the air bag 1.

Figure 11:
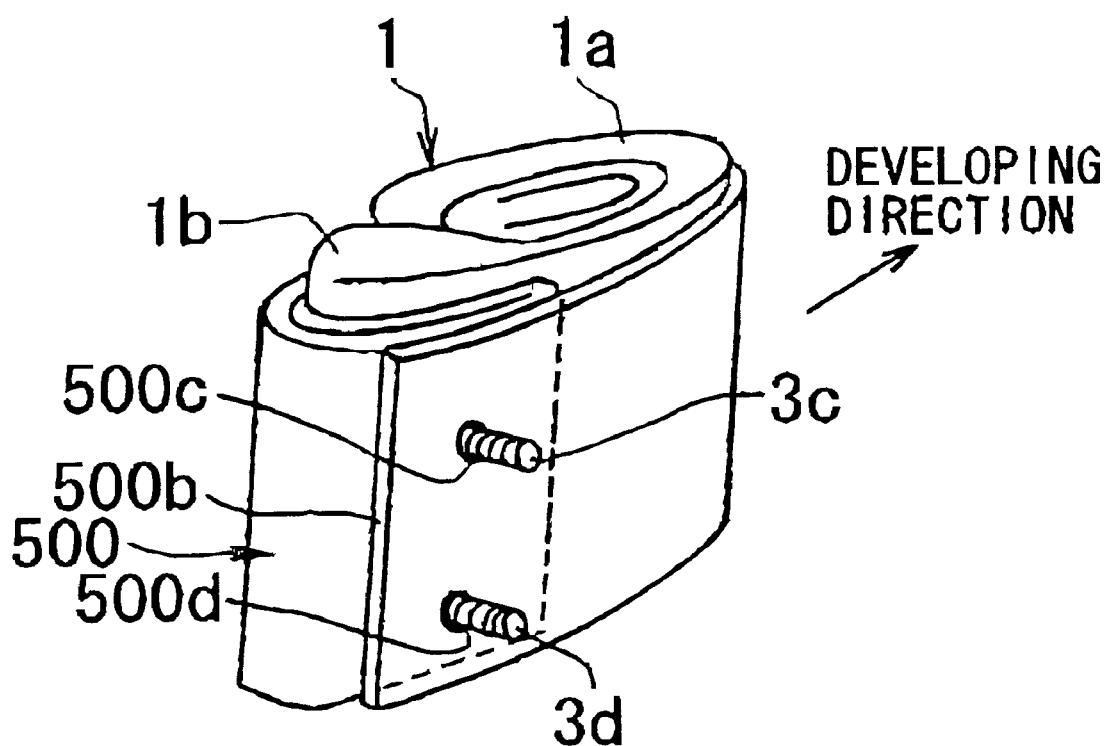
FIG. 11 is a schematic view showing a surrounding structure of the external contact fabric constituting the air bag apparatus shown In FIG. 9 from a base portion side.
Figure 12:
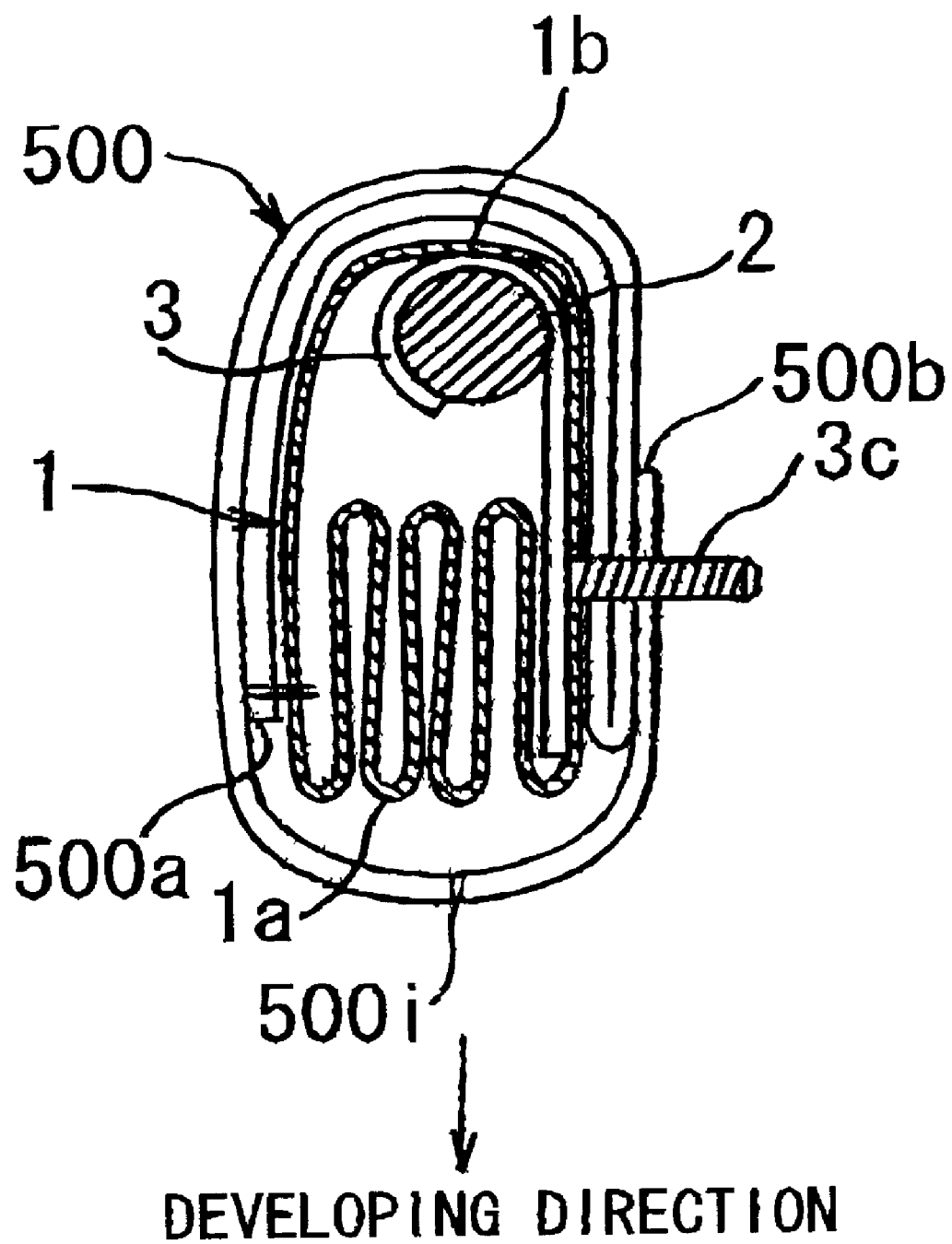
FIG. 12 is a schematic view showing the surrounding structure of the external contact fabric constituting the air bag apparatus shown in FIG. 9 by a cross section.
Figure 13:
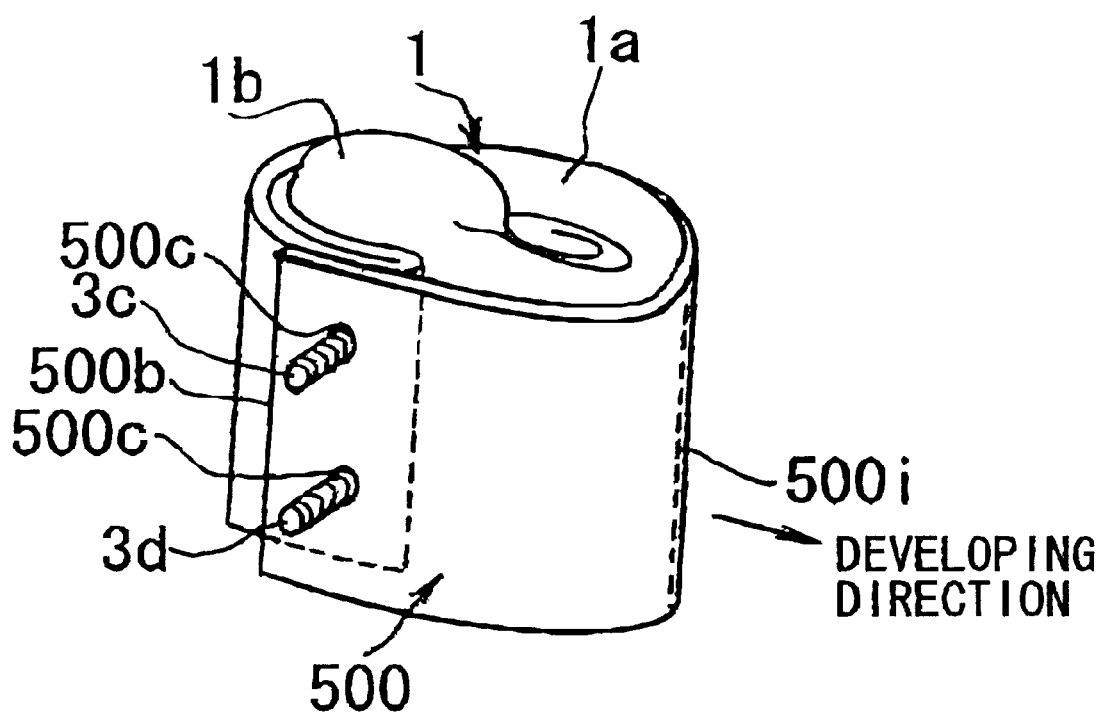
FIG. 13 is a schematic view showing a surrounding structure of a fabric member constituting the air bag apparatus shown in FIG. 9 from a front portion side.

The external contact fabric 500 surrounds the whole of the folded bag from the fastened side of one end portion 500a as shown in FIGS. 11 and 12 and is engaged at the other end portion 500b with the fastening bolts 3c and 3d of the retainer 3 through the through holes 500c and 500d, thereby being assembled to the air bag apparatus. In this assembling state of the air bag apparatus, the breaking portion 500i is positioned in the front side in an expanding and developing direction of the air bag 1 as shown in FIG. 13.

Figure 10:
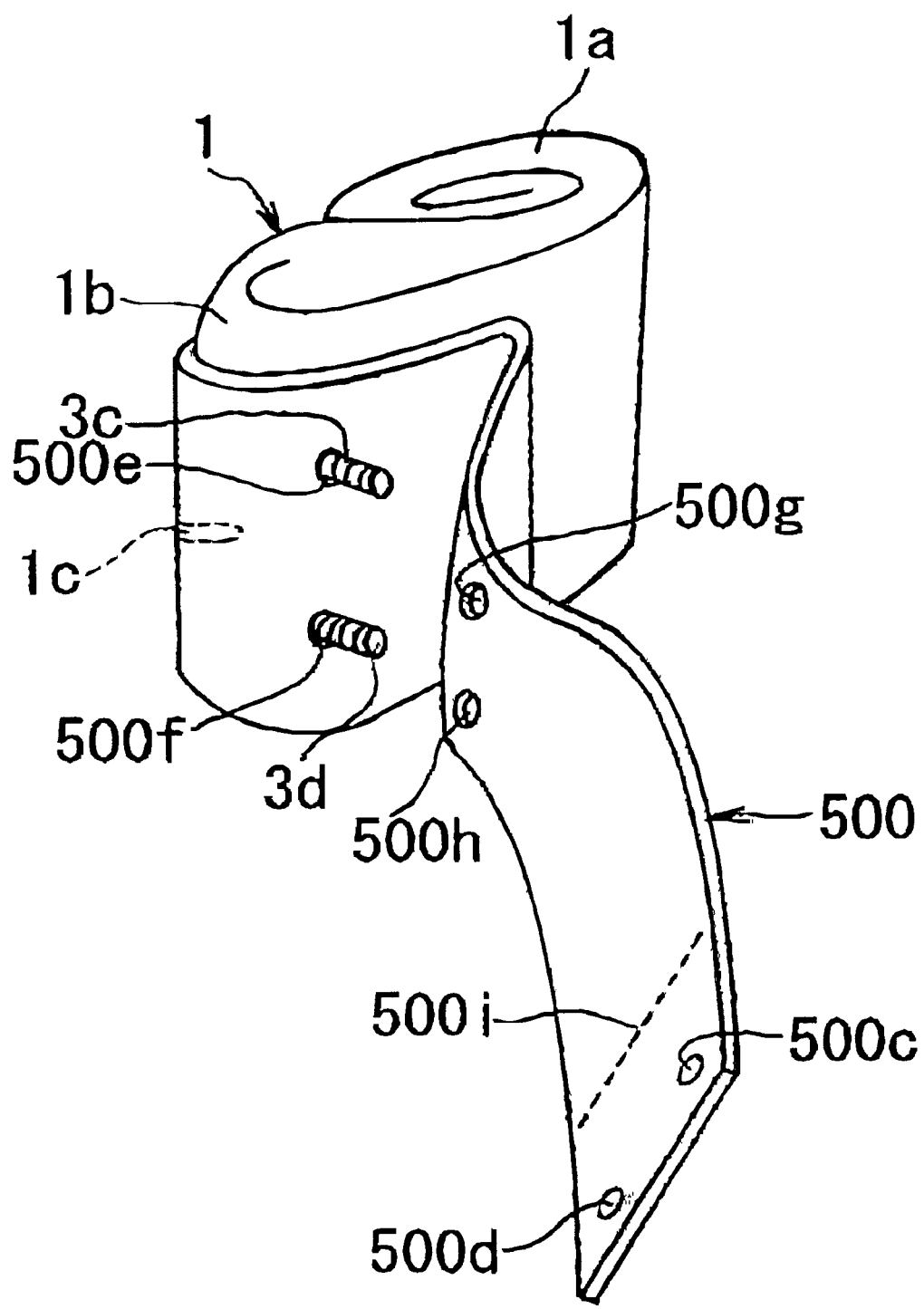
FIG. 10 is a schematic view showing a surrounding procedure of an external contact fabric constituting the air bag apparatus shown in FIG. 9.

In the external fabric 500, as shown in FIG. 10, it is possible to move the external fabric from a fastened side of one end portion 500a to an opposite side surface so as to temporarily engage a middle portion with the fastening bolts 3c and 3d of the retainer 3 by the fastening holes 500e and 500f return the external fabric from the engaged portion to the fastened side of one end portion 500a so as to again engage the middle portion with the fastening bolts 3c and 3d of the retainer 3 by the through holes 500g and 500h, and doubly surround the bag mounting base portion 1b.

In the air bag apparatus structured in this manner, since the air bag 1 is only folded in such a manner as to expand and develop and the whole of the bag including the inflator 2 is only surrounded by the external contact fabric 500 from the outer side, it is possible to keep the air bag 1 in a proper folded state in the same manner as that mentioned above and it is possible to compactly assemble with a reduced number of parts without being disengaged, whereby it is possible to construct one unit which can be easily assembled and provided within the air bag case.

Further, since the bag mounting base portion 1b is doubly surrounded by the external contact fabric 500 even when the insertion port 1c of the air bag 1 is provided in the bag mounting base portion 1b, it is possible to prevent the gas generated from the inflator 2, from leaking out.

In addition, since the bag mounting base portion 1b is doubly surrounded by the external contact fabric 500 even when the gas pressure is applied to the bag mounting base portion 1b at the beginning of the operation of the inflator 2, the portion is prevented from expanding. Further, since the gas is mainly applied to the folded bag main body 1a, the bag main body 1a Is effectively expanded, and it is possible to concentrically apply the expansion pressure of the bag main body 1a to the breaking portion 500i of the external contact fabric 500.

Accordingly, even when folding the air bag 1 and wholly surrounding the air bag 1 by the external contact fabric 500, it is possible to break the breaking portion 500a of the external contact fabric 500 In a moment together with the expansion and development of the air bag 1 so as to quickly expand and develop the air bag 1. Further, since the breaking portion 500i of the external contact fabric 500 is provided so as to be positioned in the front side in the expanding and developing direction of the air bag 1, it is possible to securely restrict the expanding and developing direction of the air bag 1.

In accordance with the mounting structure for the air bag apparatus, since the base plate portion 3b corresponding to the placing plate for the retainer 3 presses and grips the mounting base portion 1b of the air bag 1, the retainer 3 presses the insertion port 1c of the air bag 1 and is also provided for preventing the gas leakage. Further, since the double-layered portion of the external contact fabric 500 is also pressed and gripped by the base plate portion 3b of the retainer 3 together with the bag mounting base portion 1b, the external contact fabric 500 is also provided for reinforcing the bag mounting base portion 1b which can stand against the expansion and development of the bag main body 1a.

As shown in FIG. 14, each of the air bag apparatus mentioned above can be easily assembled and provided in the inner portion of the air bag case C in such a manner as not to be disengaged by protruding the fastening bolts 3c and 3d of the retainer 3 outward from the bottom portion of the air bag case C as the mounting shafts for the inflator 2. Further, the apparatus can be wholly provided in the inner portion of the seat back B by fastening and fixing the air bag case C to the side plate P of the seat back frame F by the fastening bolts 3c and 3d.

In this case, in the embodiments mentioned above, the description has been given of the structure in which the inflator 2 is held by the retainer 3 and mounted and provided by the fastening bolts 3c and 3d of the retainer 3, however, the present invention can be applied to an air bag apparatus provided with an inflator having the other structures.

As mentioned above, in accordance with the air bag apparatus according to a first aspect of the present invention, since the gas generating inflator for expanding and developing the air bag is assembled in the inner portion from the insertion port provided in the mounting base portion of the air bag, the inflator is received inside within the air bag and the internal contact fabric for closing the insertion port of the mounting base portion from the inner side is provided for preventing the gas leakage, the internal contact fabric is pressure contacted to the inner surface of the mounting base portion due to the application of the expansion pressure of the air bag, so that it is possible to completely seal the insertion port of the mounting base portion and it is possible to prevent the gas, generated from the inflator, from leaking.

In accordance with the air bag apparatus according to a second aspect of the present invention, since there is provided the internal contact fabric structured such that one end portion is sewed on the inner surface of the air bag, the other end portion is set to the free end so as to receive the inflator inside and the free end is engaged with the mounting shafts of the inflator within the air bag so as to close the insertion port of the mounting base portion from the inner side, the assembly can be easily performed so as to receive the inflator inside the internal contact fabric. Further, it is possible to provide the internal contact fabric along the inner surface side of the mounting base portion and it is possible to prevent a position shift caused by the assembly of the internal contact fabric and the application of the expansion pressure of the air bag, whereby it is possible to securely close the insertion port of the air bag from the inner side.

In accordance with the air bag apparatus according to a third aspect of the present invention, since there is provided the internal contact fabric structured such as to be received inside together with the retainer for holding the inflator and close the insertion port of the air bag from the inner side by pressing from the inner surface side by the retainer, it is possible to extend the internal contact fabric on the inner surface of the mounting base portion by the retainer so as to securely cover the insertion port of the air bag.

In accordance with the air bag apparatus according to a fourth aspect of the present invention. since the external contact fabric structured such as to surround the bag mounting base portion from the outer side is provided for reinforcing the bag mounting base portion, it is possible to press and fix the bag mounting base portion together with the internal contact fabric so as to stand against the expansion pressure and it is possible to securely expand and develop the air bag.

In accordance with the air bag apparatus according to a fifth aspect of the present invention. since the external contact fabric structured such as to surround the whole of the air bag folded in such a manner as to be capable of being expanded and developed from the outer side is provided for reinforcing the bag mounting base portion and preventing the whole from being disengaged, it is possible to compactly assemble and provide with a reduced number of parts in a state of folding the air bag in such a manner as to be capable of expanding and developing.

In accordance with the air bag apparatus according to a sixth aspect of the present invention, since there is provided the external contact fabric structured such that one end portion is sewed on the outer surface of the air bag and the other end portion is engaged with and fixed to the mounting shafts of the inflator protruding from the inner portion of the air bag to the outer portion, it is possible to keep the whole compact in a state of folding the air bag in an expandable and developable manner, and it is possible to prevent a position shift, disengagement or the like caused when assembling, whereby it is possible to securely reinforce the bag mounting base portion.

In accordance with the air bag apparatus according to a seventh aspect of the present invention, since the external contact fabric is moved from the fastened side of one end portion to the opposite side surface of the air bag so as to temporarily engage the middle portion with the mounting shafts of the inflator, return to the fastened side of one end portion from the engaged portion so as to again engage the middle portion with the mounting shafts of the inflator, and doubly surround the bag mounting base portion by the external contact fabric, and the free end is engaged with and fixed to the mounting shafts of the inflator by surrounding the folded bag main body, it is possible to keep the air bag in a proper folded state and it is possible to easily assemble the air bag in a compact manner with a reduced number of parts.

Further, since the bag mounting base portion is doubly surrounded by the external contact fabric, it is possible to prevent the gas, generated from the inflator, from leaking out, and it is possible to prevent the bag mounting base portion from being expanded even when the gas pressure is applied to the bag mounting base portion at an initial operation time of the inflator. Accordingly, the gas pressure can be mainly applied to the folded bag main body so as to effectively expand the bag main body and the expansion pressure of the bag main body can be concentrically applied to the breaking portion, so that it is possible to break the breaking portion of the external contact fabric in a moment so as to quickly expand and develop the air bag.

In accordance with the air bag apparatus according to an eighth aspect of the present invention, there is provided the external contact fabric structured such that the breaking portion is positioned in the front side in the expanding and developing direction of the air bag and provided in the width direction, it is possible to break the breaking portion of the external contact fabric in a moment due to the gas generation of the inflator so as to accurately restrict the expanding and developing direction of the air bag.

What is claimed is:

1. An air bag apparatus adapted to be mounted to a seat frame, said air bag apparatus comprising:

an air bag having an inner surface and an outer surface;

a gas generating inflator for expanding and developing said air bag; and an internal contact fabric disposed in said air bag;

said air bag having a mounting base portion and an insertion port formed in said mounting base portion for allowing said gas generating inflator to be inserted into said air bag;

said gas generating inflator having an inflator body and mounting means for mounting said air bag apparatus to said seat frame, said internal contact fabric being formed for closing the insertion port of said air;

said internal contact fabric having first and second end portions; and said internal contact fabric being fastened at said first end portion thereof onto the inner surface of said air bag:

said gas generating inflator being positioned within said air bag with said inflator body being in contact with an inner surface of said internal contact fabric and with said mounting means projecting through said second end portion of said internal contact fabric and through the mounting base portion of said air bag, whereby said internal contact fabric is securely fixed against said inner surface of said air bag to close said insertion port of said air bag.

2. An air bag apparatus according to claim 1, wherein said gas generating inflator further includes a retainer for holding said inflator body and said mounting means, and said internal contact fabric being pressed against the inner surface of said air bag by said retainer.

3. An air bag apparatus according to claim 1, further including an external contact fabric for reinforcing the mounting base portion of said air bag, said external contact fabric being attached to the outer surface of said mounting base portion and surrounding the mounting base portion.

4. An air bag apparatus according to claim 3, wherein said external contact fabric has first and second end portions, said external contact fabric being attached to the outer surface of said mounting base portion with said first end portion being fastened to said air bag and with said second end portion having said mounting means projecting therethrough.

5. An air bag apparatus according to claim 2, further including an external contact fabric for reinforcing the mounting base portion of said air bag, said external contact fabric being attached to the outer surface of said mounting base portion and surrounding the mounting base portion.

6. An air bag apparatus according to claim 5, herein said external contact fabric has first and second end portions, said external contact fabric being attached to the outer surface of said mounting base portion with said first end portion being fastened to said air bag and with said second end portion having said mounting means projecting therethrough.

7. An air bag apparatus adapted to be mounted to a seat frame, said air bag apparatus comprising:

an air bag having an inner surface and an outer surface;

a gas generating inflator for expanding and developing said air bag; and an internal contact fabric provided inside said air bag;

said air bag having a mounting base portion and an insertion port formed in said mounting base portion for allowing said gas generating inflator to be inserted into said air bag;

said gas generating inflator having an inflator body and mounting means for mounting said air bag apparatus to said seat frame;

said internal contact fabric being formed and positioned over said insertion port for closing the insertion port of said air bag such that gas leakage is prevented when said air bag is inflated;

said internal contact fabric having first and second end portions; and said internal contact fabric being fastened at said first end portion thereof onto the inner surface of said air bag;

said gas generating inflator being positioned within said air bag with said inflator body being in contact with an inner surface of said internal contact fabric and with said mounting means projecting through said second end portion of said internal contact fabric and through the mounting base portion of said air bag, so that said internal contact fabric is securely fixed against said inner surface of said air bag to close said insertion port of said air bag.

* * * * *